Figure 1:
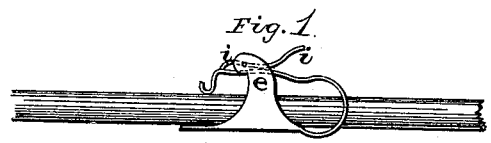
Figure 2:
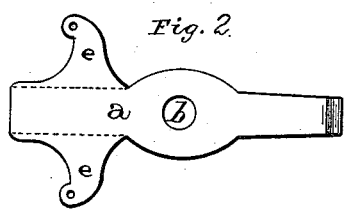
Figure 3:
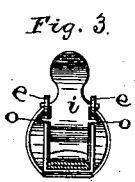
Figure 4:
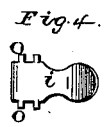

M. MATTSON.
CLAMPS FOR TUBING.

No. 191,356. Patented May 29, 1877.

WITNESSES
J. Wm Garners
Albert J. de Peyk

INVENTOR
Morris Mattson
per
F. A. Lehmann, Atty

UNITED STATES PATENT OFFICE.

MORRIS MATTSON, OF NEW YORK, N. Y.

IMPROVEMENT IN CLAMPS FOR TUBING.

Specification forming part of Letters Patent No. 191,356, dated May 29, 1877; application filed May 22, 1877.

*To all whom it may concern:*

Be it known that I, MORRIS MATTSON, of New York, in the county of New York and State of New York, have invented certain new and useful Improvements in Clamps for Tubing; and I do hereby declare the following to be a full, clear, and exact description of the invention, such as will enable others skilled in the art to which it pertains to make and use it, reference being had to the accompanying drawings, which form part of this specification.

My invention relates to an improvement in stop-cocks for rubber tubing; and it consists in the combination of a pivoted cam and spring-jaws, whereby tubing can be clamped so tightly as to at once stop the flow of water through it, and the arrangement of the parts is such that the flow can be instantly reversed by a movement of the cams, as will be more fully described hereinafter.

The accompanying drawings represent my invention.

$a$ represents a piece of spring sheet metal, which has an opening, $b$, made through its center for the passage of the tube, and has one or both of its ends bent at right angles for the purpose of clamping the tube between them without any danger of cutting or injuring it. This piece of sheet metal $a$, after it has been stamped into shape, is bent double, so as to form two jaws, which extend along a suitable distance over the surface of the tube. The lower one of these jaws is made of box shape or concave, so as to conform to the shape of the tube and is rigid, while the upper jaw may be elastic, and has its end bent, as shown, so as to press the tube tightly down upon the lower jaw. As a part of or secured to the lower jaw is a stirrup, $e$, the ends of which project up above the top of the upper jaw, and have the cam $i$ pivoted between them. When the cam is lying down the ends of the jaws are sufficiently far apart to allow any fluid to flow freely through the tube; but when it is raised upward until its shorter end has passed the center of its motion, and the stop $o$ strikes against the jaws of the stirrup, the ends of the two jaws will be pressed nearly together with sufficient force to prevent fluid of any kind from passing the clamp.

This device is intended to be applied especially to syringes, but is also adapted for use in other connections.

Having thus described my invention, I claim—

The combination of a strip of sheet metal, $a$, having a hole, $b$, through its center for the passage of the tube, and bent into shape so as to form a clamp, with the stirrup $e$, cam $i$, and stop $o$, substantially as shown and described.

In testimony that I claim the foregoing I have hereunto set my hand this 21st day of May, 1877.

MORRIS MATTSON.

Witnesses:
WM. D. LUDLOW,
F. A. LEHMANN.